J. W. BUCKLEY.
HARROW.
APPLICATION FILED DEC. 19, 1913.
1,121,468.
Patented Dec. 15, 1914.
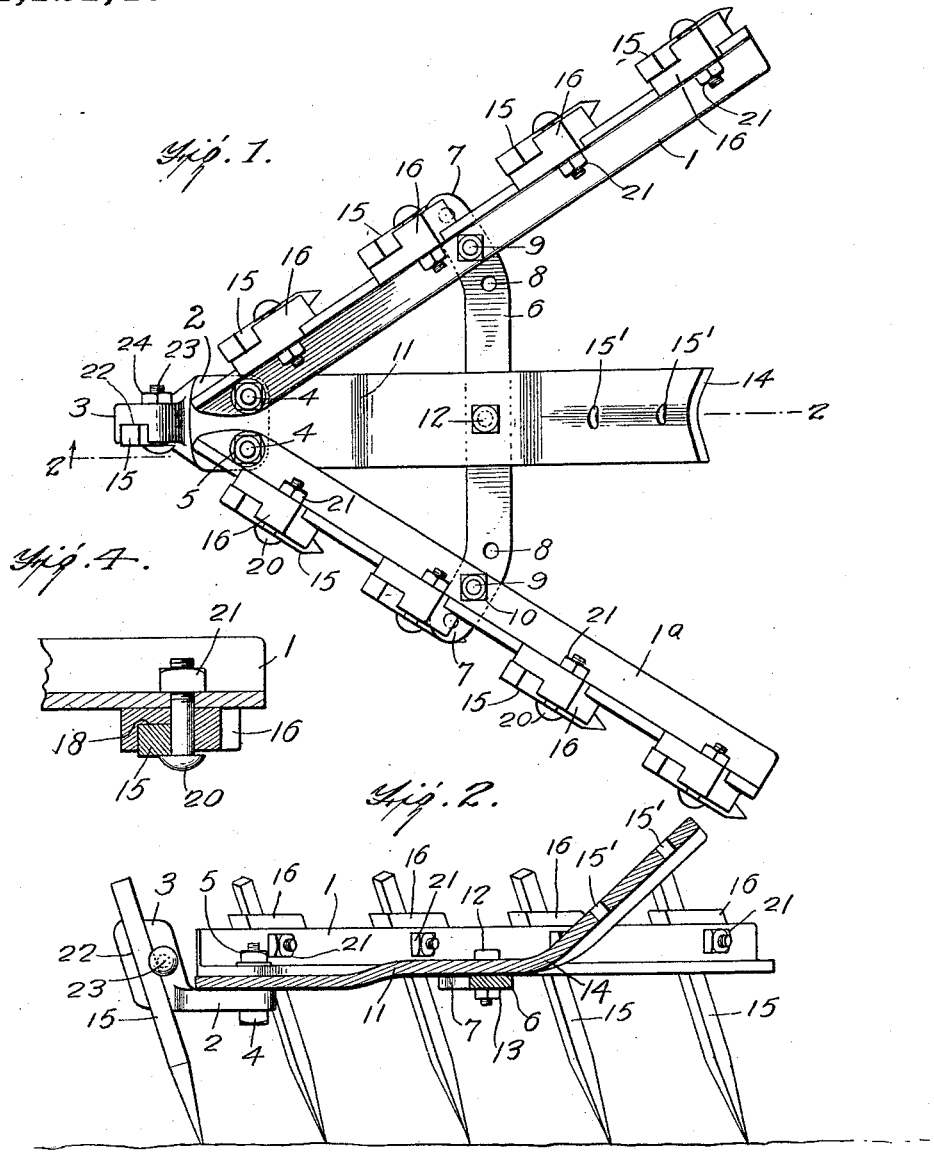
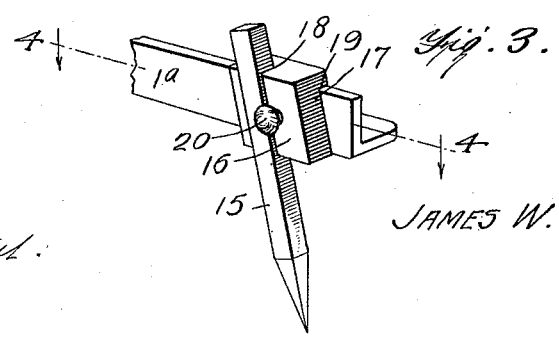
WITNESSES
INVENTOR
JAMES W. BUCKLEY,
BY Munn & Co.
ATTORNEYS

UNITED STATES PATENT OFFICE.

JAMES WILLIAM BUCKLEY, OF WEATHERFORD, TEXAS.

HARROW.

1,121,468.  Specification of Letters Patent.  Patented Dec. 15, 1914.

Application filed December 19, 1913. Serial No. 807,636.

*To all whom it may concern:*

Be it known that I, JAMES WILLIAM BUCKLEY, a citizen of the United States, and a resident of Weatherford, in the county of Parker and State of Texas, have invented a new and useful Improvement in Harrows, of which the following is a specification.

My invention is an improvement in harrows, and has for its object to provide a device of the character specified, especially adapted for use with a cultivator and of any construction, and wherein the construction is such that the harrow may be used as close to the plants as may be desired, and wherein the harrow may be guided with the handles of the cultivator in the same manner as the ordinary shovels are guided, and wherein the harrow may be cleaned, merely by lifting it to permit foreign matters to drop away from the teeth.

In the drawings:—Figure 1 is a plan view of the improved harrow, Fig. 2 is a section on the line 2—2 of Fig. 1, Fig. 3 is a perspective view of a portion of the harrow showing the manner of connecting the teeth, and Fig. 4 is a section on the line 4—4 of Fig. 3.

The present embodiment of the invention comprises side bars or members 1 and 1ª of angle material, and arranged with one of the angular portions vertical and the other horizontal. The bars or members 1 and 1ª are arranged at an angle to each other as shown in Fig. 1 and they are connected at their front ends by means of a plate 2.

The plate 2 is provided with an angular upwardly extending lug 3 at its front end, for a purpose to be later described, and the bars 1 and 1ª are connected to the plate 2 by means of bolts 4. The plate 2 is arranged beneath the bars 1 and 1ª and the bolts 4 are passed upwardly through the plate 2 and the horizontal portions of the angle bars and are engaged by nuts 5, above the said portions.

A cross plate 6 is arranged between the bars intermediate their ends, and the said cross plate is provided at each end with an angular portion 7, the said portions extending at an obtuse angle with respect to the body of the cross plate. Each of the extensions 7 is provided with a longitudinal series of openings 8, and the said openings are adapted for engagement by bolts 9, which are passed upwardly through an opening of the extension and through the horizontal portion of the angle bars and are engaged by nuts 10 above the horizontal portion.

A drag bar 11 is connected with the plate 2 and with the cross plate 6, the former connection being made by the bolts 4, while the latter is made by a bolt 12. The bolt 12 is passed downwardly through the drag bar and the cross bar 7, and is engaged by a nut 13 below the cross plate. The front end of the drag bar is offset downwardly, as shown in Fig. 2, and fits between the plate 2 and the horizontal portions of the side bars.

In rear of the cross plate 6 the angle bar is bent upwardly at an angle to the body thereof as shown at 14, and the said bent up portion is provided with a longitudinal series of openings 15'. The portion 14 of the bar is also arched transversely as shown in Figs. 1 and 2, the convexity of the arch being upward.

Teeth 15 are connected with the angle bars 1 and 1ª and with the portion 3 of the plate 2, the said teeth being connected with the vertical portions of the angle bars. The teeth are connected to the angle bars by means of blocks 16, each of the said blocks being rabbeted on one face as shown at 17, and having a transverse groove 18 on the other face. The blocks are slightly wider than the vertical portion of the angle bars, and the rabbeted portion is deep enough to receive the said vertical portion of the angle bar. The shoulder 19 formed between the rabbeted portion and the main portion of the block rests upon the upper edge of the said vertical portion of the angle bar, and the groove 18 is transverse to the said shoulder. The grooves 18 are of a width to receive the teeth 15, and a bolt 20 is passed through an opening through the block near the groove 18 and through an opening in the vertical portion of the angle bar and is engaged by a nut 21 to clamp the tooth and the block in place. The head of each bolt over-lies the adjacent tooth, and the groove 18 is of less depth than the thickness of the tooth, so that the outer face of each tooth extends beyond the outer face of the adjacent block. The blocks 16 are of rhomboidal form as shown, and the groove 18 is inclined, so that the teeth incline downwardly and rearwardly as shown in Fig. 2. A tooth 15 is also connected with the portion 3 of the plate 2, the said portion 3 having in one side face a groove 22 parallel with the groove 18 of the blocks. The tooth 15 is arranged in the groove 22, and a bolt 23 is passed through the portion 3 of the plate adjacent to the groove, and the said bolt is engaged by a nut 24 on the opposite face from the tooth. The head of the bolt overlies the outer face of the tooth, and the groove 22 is of less depth than the thickness of the tooth, so that the outer face of the tooth is beyond the adjacent face of the extension. When the nuts 5 are loosened, and the bolts 9 are removed, the angle bars 1 and 12 may be adjusted with respect to each other to cause them to diverge at a greater or less angle with respect to each other.

It will be understood that the improved harrows will in practice be used in pairs, in the same manner as the cultivating shovels, and the frames will take the place of the usual supporting frames for the cultivating teeth. The respective frames are moved by means of the usual handles in connection with the cultivator, and are cleaned by lifting the supporting frames. When moving from field to field, the frames may be turned with the teeth out of engagement with the ground. The particular mechanism for connecting the teeth with the side bars provides a secure connection that will prevent any twisting or rearward movement of the lower end of the tooth, while at the same time permitting the vertical adjustment of the teeth. As the teeth become worn, the holding bolts may be released to permit further downward movement of the teeth, and the teeth may be easily removed when broken or for any other reason.

I claim:—

In a harrow, the combination with the frame and the teeth, of a block arranged between each tooth and the frame for connecting the tooth and the frame, each block being rabbeted on one face and having a transverse groove on the other face, the block having a shoulder between the rabbeted portion and the main portion for connecting a tooth to the frame to hold the block from downward movement, and the groove inclining rearwardly toward its lower end, and being of lesser depth than the thickness of the tooth, said block having a transverse opening adjacent to the groove and the frame having an opening registering therewith, a bolt passing through the opening, the head of the bolt engaging the outer face of the tooth, and a nut engaging the bolt.

JAMES WILLIAM BUCKLEY.

Witnesses:
J. P. Owens,
J. C. Owens.

Copies of this patent may be obtained for five cents each, by addressing the "Commissioner of Patents, Washington, D. C."